(12) United States Patent
Sakamoto

(10) Patent No.: US 11,254,992 B2
(45) Date of Patent: Feb. 22, 2022

(54) METHOD OF DECHROMIZING MOLTEN IRON AND METHOD OF MANUFACTURING PHOSPHATE FERTILIZER RAW MATERIAL

(71) Applicant: NIPPON STEEL CORPORATION, Tokyo (JP)

(72) Inventor: Motohiro Sakamoto, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 57 days.

(21) Appl. No.: 16/652,575

(22) PCT Filed: Oct. 16, 2018

(86) PCT No.: PCT/JP2018/038467
§ 371 (c)(1),
(2) Date: Mar. 31, 2020

(87) PCT Pub. No.: WO2019/078199
PCT Pub. Date: Apr. 25, 2019

(65) Prior Publication Data
US 2020/0239973 A1    Jul. 30, 2020

(30) Foreign Application Priority Data
Oct. 20, 2017  (JP) .............................. JP2017-203738

(51) Int. Cl.
*C21C 1/04*    (2006.01)
*C21C 1/02*    (2006.01)

(52) U.S. Cl.
CPC . *C21C 1/04* (2013.01); *C21C 1/02* (2013.01)

(58) Field of Classification Search
CPC .................................... C21C 1/04; C21C 1/02
USPC .......................................................... 75/545
See application file for complete search history.

(56) References Cited

U.S. PATENT DOCUMENTS

2015/0000470 A1    1/2015  Iwaki et al.

FOREIGN PATENT DOCUMENTS

| EP | 2 383 352 A1 | 11/2011 |
| EP | 3 239 308 A1 | 11/2017 |
| JP | 11-158526 A | 6/1999 |
| JP | 2009-132544 A | 6/2009 |
| JP | 2011-208277 A | 10/2011 |
| JP | 5105322 B2 | 12/2012 |

(Continued)

OTHER PUBLICATIONS

International Preliminary Report on Patentability and English translation of the Written Opinion of the International Searching Authority (forms PCT/IB/373, PCT/ISA/237 and PCT/IB/338), dated Apr. 30, 2020, for corresponding International Application No. PCT/JP2018/038467.

(Continued)

*Primary Examiner* — Coris Fung
*Assistant Examiner* — Danielle Carda
(74) *Attorney, Agent, or Firm* — Birch, Stewart, Kolasch & Birch, LLP

(57) ABSTRACT

On molten iron having a P concentration of 2 to 4 mass % and having a Cr concentration of 0.3 to 1.2 mass %, a dechromization treatment is performed by adjusting a basicity (CaO mass %)/($SiO_2$ mass %) of slag to greater than 0.1 and 1 or less and supplying an oxygen source with a molten iron temperature falling within a range of 1250 to 1500° C. to manufacture molten iron having a P concentration of 1.9 to 3.8 mass % and having a Cr concentration of less than 0.2 mass %.

5 Claims, 2 Drawing Sheets

(56) References Cited

FOREIGN PATENT DOCUMENTS

| | | |
|---|---|---|
| JP | 5594183 B2 | 9/2014 |
| JP | 2014-189427 A | 10/2014 |
| JP | 2015-38250 A | 2/2015 |
| JP | 2015-189591 A | 11/2015 |
| JP | 2015-189592 A | 11/2015 |
| JP | 2016-74940 A | 5/2016 |
| JP | 2016-88757 A | 5/2016 |
| JP | 6119361 B2 | 4/2017 |
| JP | 2017-125244 A | 7/2017 |
| TW | 201038744 A1 | 11/2010 |

OTHER PUBLICATIONS

International Search Report for PCT/JP2018/038467 dated Jan. 15, 2019.

Written Opinion of the International Searching Authority for PCT/JP2018/038467 (PCT/ISA/237) dated Jan. 15, 2019.

METHOD OF DECHROMIZING MOLTEN IRON AND METHOD OF MANUFACTURING PHOSPHATE FERTILIZER RAW MATERIAL

TECHNICAL FIELD

The present invention relates to a method of dechromizing molten iron that suppresses dephosphorization during dechromization, in particular, and a method of manufacturing a phosphate fertilizer raw material.

BACKGROUND ART

Our country has a large amount of precipitation, and thus minerals flow out from the soil to facilitate acidification of the soil. Therefore, as phosphate fertilizers to be used when growing plants, basic phosphate fertilizers that increase not only the concentration of phosphate in the soil but also the pH of the soil at the same time have been used widely. Currently, as the basic phosphate fertilizer, a fused phosphate fertilizer containing large amounts of alkali has been used.

In the meantime, in a steel integrated steel plant, the molten iron tapped from a shaft furnace contains about 0.1 mass % of phosphorus as an impurity. The phosphorus in steel is a harmful element to cause cold-shortness, and thus the phosphorus in the molten iron is oxidized and removed to be discharged as steelmaking slag by adding flux and blowing oxygen into the molten iron in a steelmaking process.

As described in Patent Literature 1, the concentration of phosphate of the steelmaking slag is about 1 to 4 mass %, which is not a sufficient concentration as the phosphate fertilizer, but the steelmaking slag contains CaO derived from the flux and $SiO_2$ oxidized and removed from the molten iron in large amounts, and thus is used as a silicophosphate fertilizer.

However, in our country that is still totally dependent on imports for phosphate rock being a raw material of the phosphate fertilizer, the phosphate content in the steelmaking slag is considered as useful resources for the phosphate fertilizer, and as described in Patent Literatures 2 to 4, it has been attempted that the phosphate content in steelmaking slag is concentrated to manufacture the high phosphate concentration slag and a phosphate fertilizer is manufactured from the steelmaking slag. Furthermore, as described in Patent Literatures 5 to 7, there has been disclosed a technique of increasing a fertilizer effect by controlling mineral phases in slag. In Patent Literatures 6 and 7, in particular, there has been disclosed a technique in which steelmaking slag containing phosphorus and iron is reduced, to thereby manufacture high-P molten iron having the P concentration of 0.5 to 4.0 mass % and the high-P molten iron is further dephosphorized, to thereby manufacture the high phosphate concentration slag and molten iron having the P concentration of about 0.1 mass %.

In the meantime, when large amounts of heavy metals such as Cr are contained in a fertilizer, there is a possibility to bring harm to people or animals that have eaten crops grown with the fertilizer, and thus an appropriate management of the concentration of heavy metals in the fertilizer has been required. As a part of official standards of the phosphate fertilizer defined in Fertilizer Control Act, for example, reducing the concentration of Cr is defined.

As described previously, there have been disclosed many techniques to produce a phosphate fertilizer using steelmaking slag as a raw material. However, the steelmaking slag sometimes contains scrap or a heavy metal derived from stainless steel, which is Cr, in particular, and thus in the case where this steelmaking slag containing Cr is reduced in an electric furnace or the like, Cr in the steelmaking slag is concentrated in a seed melt and the Cr concentration of high-P molten iron tapped from the electric furnace increases up to 0.3 to 1.2 mass % in some cases. When a dephosphorization treatment is performed in this state, a dechromization reaction also occurs simultaneously with the dephosphorization and the concentration of Cr or the concentration of chromate in the high phosphate concentration slag increases, failing to sell the high phosphate concentration slag as a fertilizer. Therefore, it is necessary to remove Cr from the molten iron beforehand before the dephosphorization treatment is performed on the high-P molten iron. However, in order to improve the yield of the phosphate fertilizer at a dephosphorization treatment time, suppressing the dephosphorization reaction as much as possible is required when a dechromization treatment is performed.

As a technique to remove Cr, Patent Literature 8 has disclosed a technique of removing Cr from high-P molten iron, and in this technique, flux is added to high-P molten iron containing Cr, to thereby control a basicity (CaO mass %)/($SiO_2$ mass %) to 0.1 or less, and further an oxygen source is added, to thereby perform a dechromization treatment.

In order to produce the phosphate fertilizer raw material more efficiently, using high-P molten iron having the higher P concentration is desired recently. In the technique described in Patent Literature 8, as the molten iron on which the dechromization treatment is performed, molten iron having the P concentration of 1.5 mass % is set as an object, and application of the technique in Patent Literature 8 is difficult when the P concentration in molten iron is higher. The reason is as follows.

In the case where the dechromization treatment is performed on molten iron having the high P concentration, which is 3 mass %, for example, the dephosphorization reaction is also likely to progress simultaneously with the dechromization reaction. As a result, as compared to the molten iron having the low P concentration, $P_2O_5$ in the slag increases in concentration. Further, $P_2O_5$ is an acidic oxide, has a low melting point, and has a property to lower a liquidus temperature of the slag. This significantly affects a generation speed of $Cr_2O_3$ during the dechromization reaction and the dechromization reaction as compared to the case where the dechromization treatment is performed on molten iron having the low P concentration.

CITATION LIST

Patent Literature

Patent Literature 1: Japanese Patent No. 5105322
Patent Literature 2: Japanese Laid-open Patent Publication No. 11-158526
Patent Literature 3: Japanese Laid-open Patent Publication No. 2009-132544
Patent Literature 4: Japanese Patent No. 5594183
Patent Literature 5: Japanese Laid-open Patent Publication No. 2015-189591
Patent Literature 6: Japanese Laid-open Patent Publication No. 2016-74940
Patent Literature 7: Japanese Laid-open Patent Publication No. 2016-88757
Patent Literature 8: Japanese Patent No. 6119361

SUMMARY OF INVENTION

Technical Problem

Thus, in consideration of the above circumstances, an object of the present invention is to provide a method of dechromizing molten iron capable of promoting a dechromization reaction while suppressing a dephosphorization reaction and a method of manufacturing a phosphate fertilizer raw material that satisfies fertilizer standards from high-P molten iron manufactured by using steelmaking slag as a raw material.

Solution to Problem

As a result of the examination conducted while focusing on flux to be used at a dechromization treatment time of high-P molten iron containing Cr and a dechromization ratio and a dephosphorization ratio in terms of a manufacturing condition for the purpose of achieving the above-described object, the present inventor found out that there is a large difference in dependence on basicity between the dechromization ratio and the dephosphorization ratio, and then found out that utilizing this difference makes it possible to cause the dechromization reaction and suppress the dephosphorization reaction.

The present invention based on the above-described findings is as follows.

(1) A method of dechromizing molten iron includes:
on molten iron having the P concentration of 2 to 4 mass % and having the Cr concentration of 0.3 to 1.2 mass %,
performing a dechromization treatment by adjusting a basicity (CaO mass %)/($SiO_2$ mass %) of slag to greater than 0.1 and 1 or less and supplying an oxygen source with a molten iron temperature falling within a range of 1250 to 1500° C. and manufacturing molten iron having the P concentration of 1.9 to 3.8 mass % and having the Cr concentration of less than 0.2 mass %.
(2) The method of dechromizing the molten iron according to (1), in which the basicity of the slag is adjusted by setting an added amount of flux to 25 kg/t or less.
(3) The method of dechromizing the molten iron according to (1) or (2), in which a starting raw material of the molten iron having the P concentration of 2 to 4 mass % and having the Cr concentration of 0.3 to 1.2 mass % is steelmaking slag obtained by dephosphorizing molten iron manufactured in a shaft furnace.
(4) A method of manufacturing a phosphate fertilizer raw material includes:
on molten iron obtained by the method of dechromizing the molten iron according to any one of (1) to (3), further performing a dephosphorization treatment and cooling.

Advantageous Effects of Invention

According to the present invention, it is possible to provide a method of dechromizing molten iron capable of promoting a dechromization reaction while suppressing a dephosphorization reaction and a method of manufacturing a phosphate fertilizer raw material that satisfies fertilizer standards from high-P molten iron manufactured by using steelmaking slag as a raw material.

DESCRIPTION OF EMBODIMENTS

In the present invention, a dechromization treatment is performed on high-P molten iron having the P concentration of 2 to 4 mass % and having the Cr concentration of 0.3 to 1.2 mass % by setting a basicity (CaO mass %)/($SiO_2$ mass %) of slag to greater than 0.1 and 1 or less and setting iron ore and/or gaseous oxygen to an oxygen source within a range of 1250 to 1500° C. Then, after Cr-containing slag generated at this time is discharged, a dephosphorization treatment is performed on the remaining molten iron. The oxygen source is selected so as to be capable of keeping a molten iron temperature appropriately.

Further, the above-described high-P molten iron is characterized in that steelmaking slag manufactured by melting scrap in molten iron manufactured in a shaft furnace and then dephosphorizing the resultant molten iron is a starting raw material.

Figure 1:
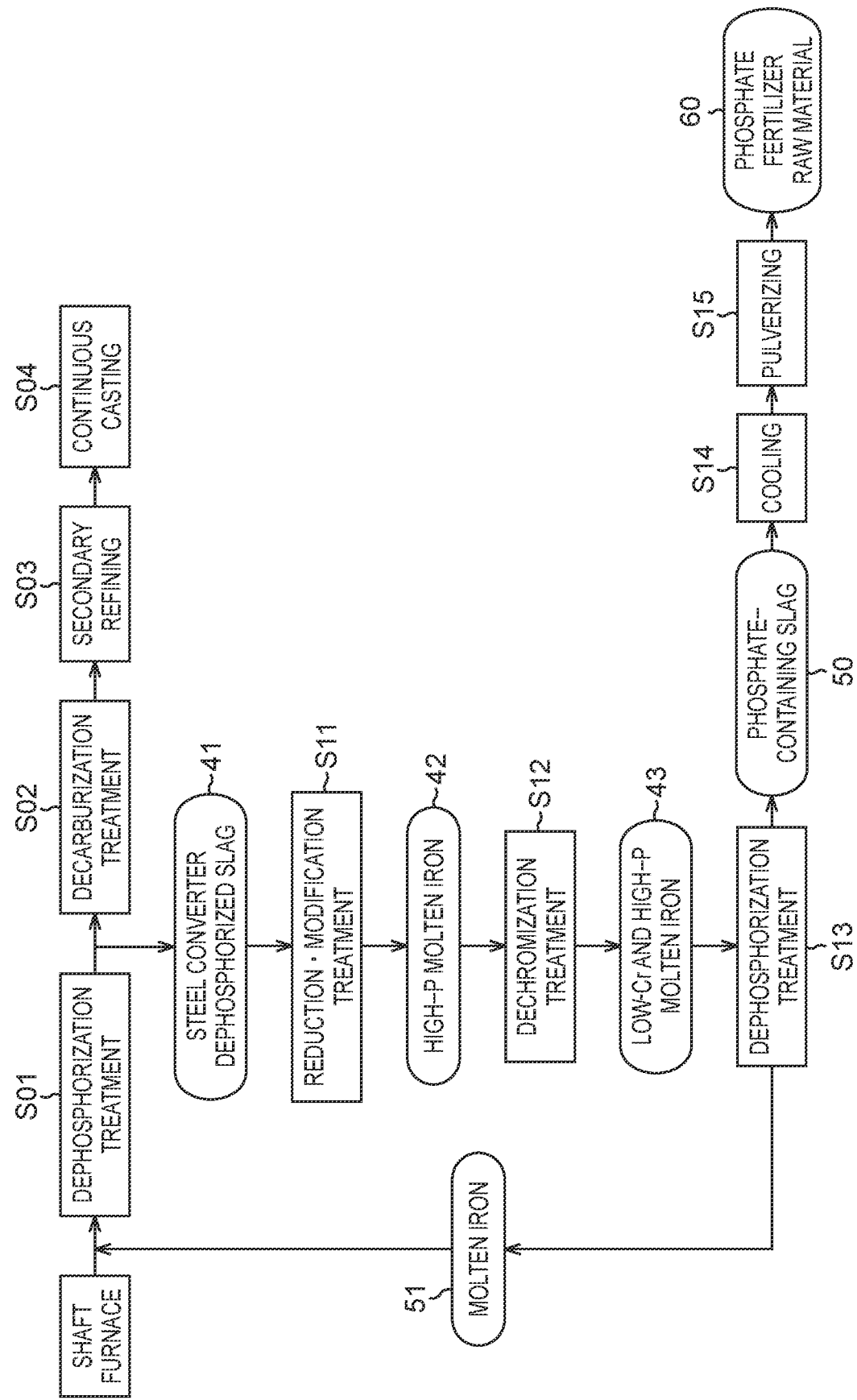
FIG. 1 is a view illustrating one example of steps of manufacturing phosphate-containing slag in a steelmaking step.

First, there will be explained a method of manufacturing phosphate-containing slag usable as a raw material of a phosphate fertilizer for growing plants (a phosphate fertilizer raw material) by using the steelmaking slag as a raw material. FIG. 1 illustrates one example of steps of manufacturing the phosphate-containing slag in a steelmaking step., including a dechromization treatment S12.

As illustrated in FIG. 1, in the steelmaking step, molten iron normally containing 0.08 to 0.15 mass % of phosphorus, being molten iron manufactured in a shaft furnace, is transferred into a steel converter, slag is formed on the molten iron, and an oxygen source is blown into the molten iron, and by a reaction of the molten iron and the slag, a dephosphorization treatment S01 of the molten iron is performed.

Steel converter dephosphorized slag 41 generated by the dephosphorization treatment S01 is discharged from the steel converter, and thereafter slag is formed again on the molten iron in the steel converter, the oxygen source is blown into the molten iron, and a decarburization treatment S02 is performed. Secondary refining S03 is performed on molten steel obtained by the decarburization treatment S02, and then, by continuous casting S04, a steel billet is manufactured.

In the steel converter dephosphorized slag 41 discharged from the steel converter after the dephosphorization treatment S01, phosphate resulting from oxidation of the phosphorus in the molten iron and a large amount of iron are contained. Then, in order to recover valuable elements such as iron and phosphorus from the steel converter dephosphorized slag 41, a reduction•modification treatment S11 is performed on the steel converter dephosphorized slag 41.

In the reduction•modification treatment S11, the steel converter dephosphorized slag 41 is melted and has, as a reducing agent and a modifier, pulverized coal, an $Al_2O_3$ source, and a $SiO_2$ source added thereto, to thereby manufacture high-P molten iron 42 that contains as much as 0.3 to 1.2 mass % of Cr and as much as 2 to 4 mass % of P.

Then, the high-P molten iron 42 is received in a pot and flux containing a CaO source such as quicklime or calcium carbonate and a $SiO_2$ source such as quartz sand is added to the high-P molten iron 42 in the pot, to thereby adjust the basicity of the slag to greater than 0.1 and 1 or less, and with the molten iron temperature falling within a range of 1250 to 1500° C., iron ore is added and/or as the oxygen source, gaseous oxygen is blown into the high-P molten iron 42, to thereby manufacture low-Cr and high-P molten iron 43 having the Cr concentration of less than 0.2 mass % and having the P concentration of 1.9 to 3.8 mass %. As long as the Cr concentration is less than 0.2 mass %, a fertilizer within standards in the Fertilizer Control Act can be manufactured when the phosphate fertilizer raw material described in Patent Literature 5 or 6, for example, is manufactured from the low-Cr and high-P molten iron 43.

Further, when the high-P molten iron 42 is received in the pot, the slag remaining in a reducing furnace (with a basicity of 0.9 to 1.3, $Al_2O_3$: about 10 mass %, t. Fe<5 mass %), which is about 10 kg/t, is also discharged into the pot inevitably as carrying-over slag together with the molten iron. In order to suppress the dephosphorization reaction as much as possible and promote the dechromization reaction, it is necessary to add the flux and adjust the basicity. Here, when the amount of the slag is too much, the slag may overflow from the pot and stirring is not easy in the case of the pot in particular, and thus there is a possibility that a slag/metal reaction is not made sufficiently. Operationally, the amount of the slag in the pot is preferably set to 50 kg/t or less, and thus the amount of the flux to be added is preferably set to 25 kg/t or less when the amounts of chromate and phosphate to be generated are estimated, resulting in that it is often about 20 kg/t. Incidentally, when the basicity of the carrying-over slag is 1.0 or less and the Cr concentration of the high-P molten iron tapped from the reducing furnace is low, the dechromization reaction is made only with the carrying-over slag, thereby making it possible to manufacture low-Cr and high-P molten iron having the Cr concentration of less than 0.2 mass % and having the P concentration of 1.9 to 3.8 mass %. Accordingly, the addition of the flux is not required in such a case.

After the Cr-containing slag is discharged, the flux is added to the low-Cr and high-P molten iron 43 and a dephosphorization treatment S13 is performed on the resultant low-Cr and high-P molten iron 43, to manufacture phosphate-containing slag 50. For the dephosphorization treatment S13 at this time, the technique described in Patent Literature 5 or 6 is used. That is, in the dephosphorization treatment, flux that has a basicity of 0.8 to 1.5 and contains iron oxide whose concentration is 10 mass % or more in terms of t. Fe concentration is added, and at the same time, oxygen is blown into the low-Cr and high-P molten iron 43, and the molten iron temperature at the end of the treatment is set to fall within a range of 1200° C. or more and 1450° C. or less. Incidentally, a secondary material is further added after the concentration of phosphate in the slag becomes 5 mass % or more in the middle of this dephosphorization treatment, to thereby adjust a basicity $\alpha$ of the final slag to 1.5 or more and 3.0 or less, adjust the concentration of phosphate in this slag to 8 to $(-4\alpha^2+23\alpha-4)$, and adjust the iron oxide concentration (Fe equivalent) to 5 to 25 mass %. Thereby, the phosphate-containing slag 50 is manufactured.

Then, in a cooling process S14, cooling is performed down to 600° C. from 1200 to 1450° C. being the temperature when this dephosphorization treatment is finished at a cooling rate of 10'/min or more being a numerical value obtained by dividing a temperature drop amount until the temperature reaches 600° C. by a time period until the temperature reaches 600° C. Further, a pulverizing process S15 is also performed as necessary to obtain a phosphate fertilizer raw material 60. The obtained phosphate fertilizer raw material 60 is a phosphate fertilizer raw material that contains 60 mass % or more in total of CaO, $SiO_2$, $P_2O_5$, and iron oxide (Fe equivalent) and has the basicity $\alpha$ of 1.5 or more and 3.0 or less, in which 8 mass % or more and $(-4\alpha^2+23\alpha-4)$ mass % or less of $P_2O_5$ is contained and 5 mass % or more and 25 mass % or less in Fe equivalent of iron oxide is contained, and in the phosphate fertilizer raw material, the total existing concentration of one or two or more of a $Ca_3(PO_4)_2$—$Ca_2SiO_4$ solid solution, $5CaO.SiO_2.P_2O_5$, and $7CaO.2SiO_2.P_2O_5$ is 28 mass % or more.

Incidentally, molten iron 51 dephosphorized to 0.1 to 0.3 mass % in terms of a phosphorus-containing concentration by the dephosphorization treatment S13 is supplied to the steel converter together with the molten iron generated in the shaft furnace.

Hereinafter, there will be explained (1) the reason for limiting a chemical composition of the molten iron, (2) the reason for limiting the basicity in the slag, and (3) the reason for limiting the treatment temperature in order to promote, of the high-P molten iron containing 0.3 to 1.2 mass % of Cr, a dechromization reaction and suppress a dephosphorization reaction in a dechromization treatment.

(1) Composition of the High-P Molten Iron

The dechromization treatment is affected by the composition of the high-P molten iron at the dechromization treatment time. In the present invention, the high-P molten iron containing the Cr concentration of 0.3 to 1.2 mass % and the P concentration of 2 to 4 mass % is set as an object, but more preferably, molten iron in which "the Cr concentration is 0.3 to 1.2 mass %, the C concentration is 3.0 to 5.0 mass %, the Si concentration is 0.6 mass % or less, the Mn concentration is 0.3 to 1.4 mass %, and the P concentration is 2.5 to 4.0 mass %" is set as an object.

(2) Basicity in the Slag

Next, it is necessary to set the basicity (CaO mass %)/($SiO_2$ mass %) in the slag to greater than 0.1 and 1 or less. When the basicity is 0.1 or less, the melting point of the slag increases because the content of CaO is small, and then it becomes difficult to remove the Cr-containing slag, and thus the basicity is set to greater than 0.1. The basicity is preferably set to 1.5 or more and further preferably set to 0.3 or more. Further, the upper limit of the basicity is determined by the following experiment.

There experimented with the dechromization treatment on the high-P molten iron having the Cr concentration of 0.3 to 1.2 mass % and having the P concentration of 3 mass % by using a 1-t melting furnace. In the experiment, flux was added so as to make the amount of slag be about 50 kg/t and make the basicity fall within a range of 0 to 2, and with a treatment temperature set to 1400° C., 21 kg/t in total of iron oxide and oxygen was added. The Cr concentration in the molten iron after the experiment became 0.1 to 0.2 mass %.

Figure 2:
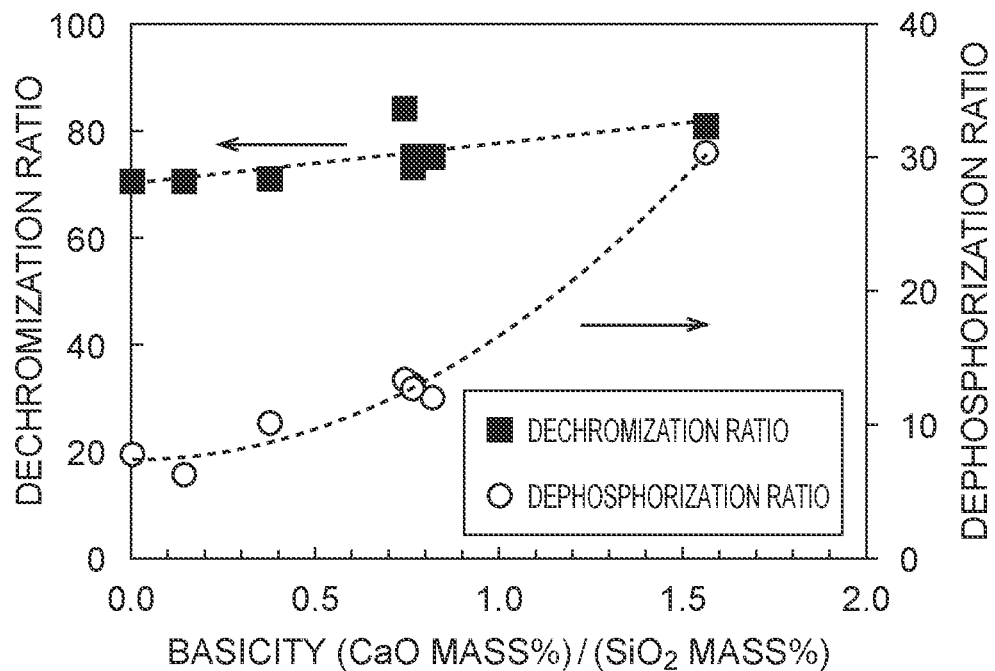
FIG. 2 is a view illustrating the relation between a basicity in slag and a dechromization ratio and a dephosphorization ratio.
Figure 3:
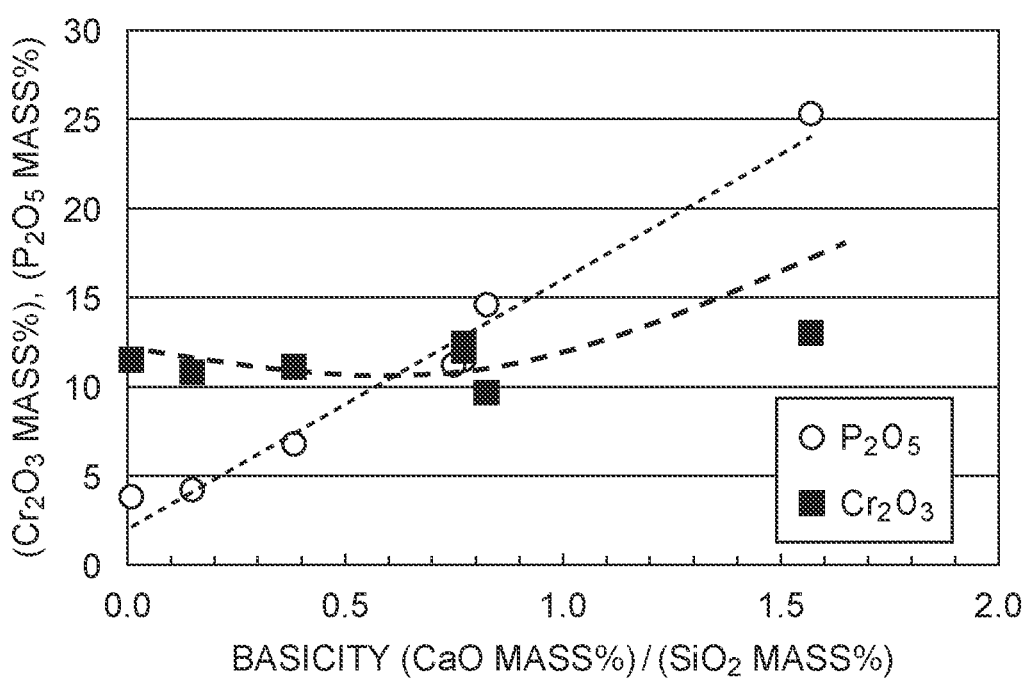
FIG. 3 is a view illustrating the relation between the basicity in the slag and concentrations of chromate and phosphate.

FIG. 2 illustrates results obtained by calculating a dechromization ratio and a dephosphorization ratio from the Cr concentration and the P concentration in the molten iron before and after the experiment, and FIG. 3 illustrates concentrations of chromate and phosphate in the slag after the dechromization treatment. The dechromization ratio and the dephosphorization ratio both increased as the basicity increased, but the effect of the basicity on the dephosphorization ratio was larger than that on the dechromization ratio and a large difference was also seen in the concentration of the phosphate in the slag. It is necessary to suppress the dephosphorization ratio in the dechromization treatment in order to increase a recovery ratio of phosphorus in the dephosphorization treatment after the dechromization treatment. The results illustrated in FIG. 2 reveal that when the basicity exceeds 1, the dependence of the dephosphorization ratio on the basicity increases. This reveals that it is necessary to set the basicity to 1 or less in order to suppress the dephosphorization reaction while causing the dechromization reaction. The basicity is preferably set to 0.9 or less and further preferably set to 0.85 or less.

(3) Treatment Temperature

When the low-Cr and high-P molten iron is manufactured, it is necessary to adjust the composition and the basicity to the above-described composition and basicity and further perform the treatment at the molten iron temperature of 1250 to 1500° C. The temperature of the molten slag is thought to be substantially equal to the molten iron temperature, and thus when the molten iron temperature is less than 1250° C., the slag is not melted completely in some cases, and in the case, the fertilizer effect as the phosphate fertilizer is not exhibited even when the dephosphorization treatment is performed thereafter. In the meantime, the dechromization reaction is an exothermic reaction, and thus a higher temperature makes the reaction difficult to progress. Therefore, when the molten iron temperature exceeds 1500° C., the concentration of chromate in the slag decreases. Besides, the heating cost increases, and further refractories of a treatment container are worn out heavily, and thus the temperature is inappropriate. The molten iron temperature is preferably 1300 to 1450° C.

In the foregoing, the technique to perform the dechromization treatment from the high-P molten iron has been explained, but the present invention is not limited to the above-described explanation, and can be changed appropriately within a range not departing from the technical ideas of the invention.

EXAMPLE

Next, examples of the present invention will be described, but conditions of the examples are condition examples employed for confirming the applicability and effects of the present invention, and the present invention is not limited to these condition examples. The present invention can employ various conditions as long as the object of the present invention is achieved without departing from the spirit of the invention.

First, high-P molten iron having an initial molten iron composition illustrated in Table 1 below was discharged into a pot together with carrying-over slag, and a dechromization treatment was performed under the condition of a temperature, an added amount of flux, and an oxygen amount illustrated in Table 1. The composition in the molten iron was examined before and after the dechromization treatment, and further a composition of Cr-containing slag after the dechromization treatment was also examined.

First, a removing property of the slag was evaluated, that is, the one in which slag removal was enabled was evaluated as ○, the one in which slag removal was enabled but time was required slightly for the slag removal was evaluated as Δ, and the one in which slag removal was difficult was evaluated as X. Then, as comprehensive evaluation, the one in which no problem was caused in terms of slag removal under the condition of the dephosphorization ratio being 15% or less and the dechromization ratio being 70% or more was evaluated as ⊚, the one in which the dephosphorization ratio was 15% or less and the dechromization ratio was 70% or more but time was required slightly for the slag removal was evaluated as ○, and the one in which the dephosphorization ratio was larger than 15%, slag removal was difficult, or the dechromization ratio was less than 70% was evaluated as X. The dechromization ratio and the dephosphorization ratio were calculated from the initial molten iron composition and the molten iron composition after the dechromization treatment.

TABLE 1

| EXPERIMENTAL CONDITION | TEMPERATURE ° C. | INITIAL MOLTEN IRON COMPOSITION mass % | | | ADDED FLUX kg/t | | OXYGEN AMOUNT IN OXYGEN + IRON OXIDE kg/t | MOLTEN IRON COMPOSITION mass % | |
|---|---|---|---|---|---|---|---|---|---|
| | | C | P | Cr | CaO | SiO$_2$ | | [P] | [Cr] |
| EXAMPLE 1 | 1410 | 3.6 | 3.1 | 0.53 | 2.1 | 16.1 | 22.0 | 2.9 | 0.16 |
| EXAMPLE 2 | 1420 | 3.6 | 3.1 | 0.55 | 7.5 | 10.7 | 20.5 | 2.8 | 0.16 |
| EXAMPLE 3 | 1380 | 3.5 | 3.0 | 0.52 | 11.3 | 7.0 | 21.9 | 2.6 | 0.14 |
| EXAMPLE 4 | 1410 | 3.6 | 3.0 | 0.52 | 11.3 | 7.0 | 21.4 | 2.6 | 0.13 |
| EXAMPLE 5 | 1390 | 3.6 | 3.0 | 1.19 | 11.3 | 7.0 | 21.9 | 2.6 | 0.19 |
| EXAMPLE 6 | 1320 | 3.6 | 3.0 | 0.52 | 11.3 | 7.0 | 21.7 | 2.6 | 0.13 |
| EXAMPLE 7 | 1330 | 3.5 | 3.9 | 0.51 | 7.5 | 10.7 | 21.7 | 3.7 | 0.15 |
| EXAMPLE 8 | 1330 | 3.5 | 2.1 | 0.60 | 7.5 | 10.7 | 21.7 | 1.9 | 0.18 |
| COMPARATIVE EXAMPLE 1 | 1390 | 3.7 | 2.9 | 0.52 | 15.0 | 3.2 | 22.3 | 2.0 | 0.10 |
| COMPARATIVE EXAMPLE 2 | 1430 | 3.6 | 3.1 | 0.54 | 0.0 | 18.2 | 21.5 | 2.9 | 0.16 |
| COMPARATIVE EXAMPLE 3 | 1540 | 3.6 | 3.0 | 0.53 | 7.5 | 10.7 | 21.1 | 2.8 | 0.24 |
| COMPARATIVE EXAMPLE 4 | 1320 | 3.6 | 1.9 | 0.52 | 7.5 | 10.7 | 21.7 | 1.8 | 0.30 |

| EXPERIMENTAL CONDITION | SLAG COMPOSITION mass % | | | DE-PHOSPHORIZATION RATIO % | DE-CHROMIZATION RATIO % | SLAG REMOVING PROPERTY | COMPRE-HENSIVE EVALU-ATION |
|---|---|---|---|---|---|---|---|
| | BASICITY | P$_2$O$_5$ | Cr$_2$O$_3$ | | | | |
| EXAMPLE 1 | 0.15 | 4.2 | 10.8 | 6.2 | 70.4 | Δ | ○ |
| EXAMPLE 2 | 0.38 | 6.8 | 11.1 | 10.1 | 70.9 | ○ | ⊚ |
| EXAMPLE 3 | 0.77 | 11..5 | 12.0 | 13.0 | 73.1 | ○ | ⊚ |
| EXAMPLE 4 | 0.83 | 14.6 | 9.7 | 12.0 | 75.0 | ○ | ⊚ |
| EXAMPLE 5 | 0.75 | 11.2 | 22.3 | 13.3 | 84.0 | ○ | ⊚ |

TABLE 1-continued

| | | | | | | | |
|---|---|---|---|---|---|---|---|
| EXAMPLE 6 | 0.77 | 12.0 | 12.4 | 12.7 | 75.0 | ○ | ◎ |
| EXAMPLE 7 | 0.77 | 12.3 | 10.6 | 5.1 | 70.6 | ○ | ◎ |
| EXAMPLE 8 | 0.77 | 11.8 | 10.5 | 9.5 | 70.0 | ○ | ◎ |
| COMPARATIVE EXAMPLE 1 | 1.57 | 25.3 | 13.0 | 30.3 | 80.8 | ○ | X |
| COMPARATIVE EXAMPLE 2 | 0.01 | 3.8 | 11.5 | 7.7 | 70.4 | X | X |
| COMPARATIVE EXAMPLE 3 | 0.36 | 4.1 | 8.9 | 8.9 | 54.7 | ○ | X |
| COMPARATIVE EXAMPLE 4 | 0.38 | 3.1 | 4.7 | 5.3 | 42.3 | ○ | X |

In Examples 1 to 8, with respect to the molten irons having the P concentration of 2 to 4 mass % and having the Cr concentration of 0.3 to 1.2 mass %, the basicity of the slag was set to less than 0.1 and 1 or less and iron ore and gaseous oxygen were set as an oxygen source in a range of 1250 to 1500° C. As a result, in Examples 1 to 8, it was possible to perform removal of the Cr-containing slag without problems, and the dephosphorization ratio was 15% or less and the dechromization ratio was 70% or more.

Comparative example 1 is an example where the basicity was greater than 1, and exhibits the results obtained when the dechromization treatment was performed under the condition that the items other than the basicity are within the above-described ranges. The basicity was greater than 1, and thus the dephosphorization reaction also progressed, leading to 30% of the dephosphorization ratio. Comparative example 2 is an example where the basicity was 0.1 or less because no CaO was added, and exhibits the results obtained when the dechromization treatment was performed under the condition that the items other than the basicity are within the above-described ranges. In this case, the basicity was too low and the melting point of the slag increased, resulting in failing to efficiently remove the Cr-containing slag. Comparative example 3 exhibits the results obtained when the dechromization treatment was performed under the condition that the treatment temperature is 1540° C. and the items other than the treatment temperature are within the above-described ranges. The treatment temperature was too high, and thus the dechromization reaction did not progress easily, leading to 60% or less of the dechromization ratio. Comparative example 4 is an example where the P concentration was less than 2.0 in the initial molten iron composition, and thus the dephosphorization ratio was extremely low and the dechromization ratio was also low. This is conceivably because the P concentration was too low in the initial molten iron composition, and thus the range where the basicity is greater than 0.1 and 1.0 or less no longer became optimum.

INDUSTRIAL APPLICABILITY

According to the present invention, it is possible to provide a method of dechromizing molten iron capable of promoting a dechromization reaction while suppressing a dephosphorization reaction and a method of manufacturing a phosphate fertilizer raw material that satisfies fertilizer standards from high-P molten iron manufactured by using steelmaking slag as a raw material.

The invention claimed is:

1. A method of dechromizing molten iron, comprising:
on the molten iron having a P concentration of 2 to 4 mass % and having a Cr concentration of 0.3 to 1.2 mass %, performing a dechromization treatment by adjusting a basicity (CaO mass %)/(SiO$_2$ mass %) of a slag to greater than 0.1 to 1 or less and supplying an oxygen source to the molten iron at a temperature within a range of 1250 to 1500° C. and manufacturing a molten iron having a P concentration of 1.9 to 3.8 mass % and having a Cr concentration of less than 0.2 mass %.

2. The method of dechromizing the molten iron according to claim 1, wherein
the basicity of the slag is adjusted by setting an added amount of flux to 25 kg/ton or less.

3. The method of dechromizing the molten iron according to claim 2, wherein
a starting raw material of the molten iron having the P concentration of 2 to 4 mass % and having the Cr concentration of 0.3 to 1.2 mass % is steelmaking slag obtained by dephosphorizing molten iron manufactured in a shaft furnace.

4. The method of dechromizing the molten iron according to claim 1, wherein
a starting raw material of the molten iron having the P concentration of 2 to 4 mass % and having the Cr concentration of 0.3 to 1.2 mass % is steelmaking slag obtained by dephosphorizing molten iron manufactured in a shaft furnace.

5. A method of manufacturing a phosphate fertilizer raw material, comprising:
on the molten iron having the P concentration of 1.9 to 3.8 mass % and having the Cr concentration of less than 0.2 mass % obtained by the method of dechromizing molten iron according to claim 1, further performing a dephosphorization treatment and cooling.

* * * * *